J. W. CRIDER.
PEANUT PLANTER.
APPLICATION FILED JUNE 3, 1915.
1,164,171.
Patented Dec. 14, 1915.
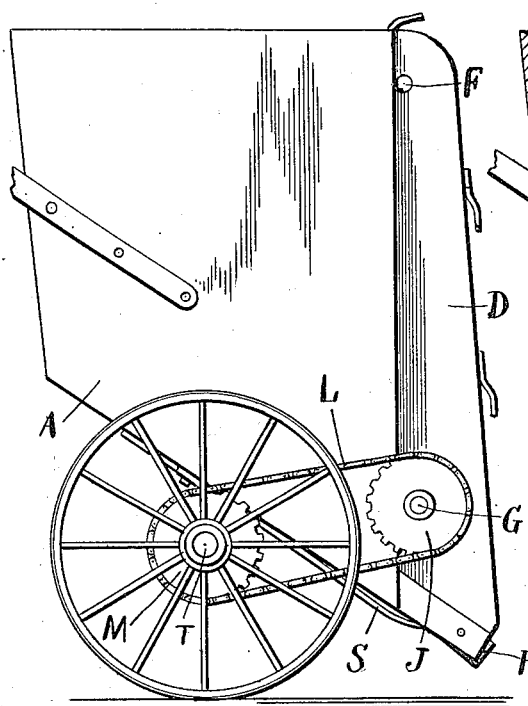
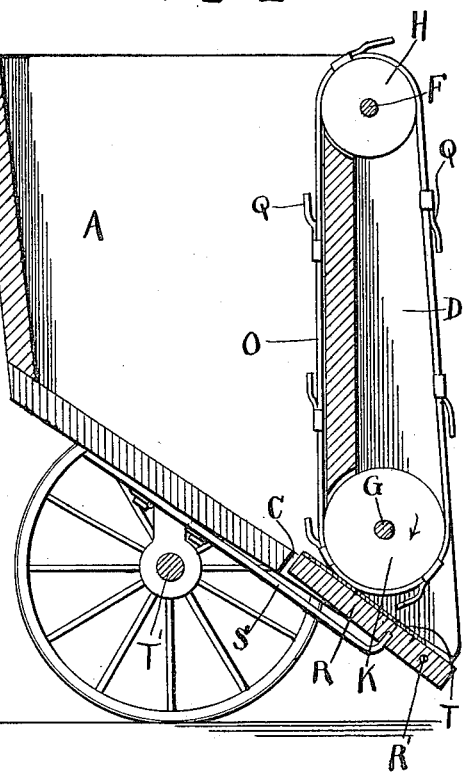
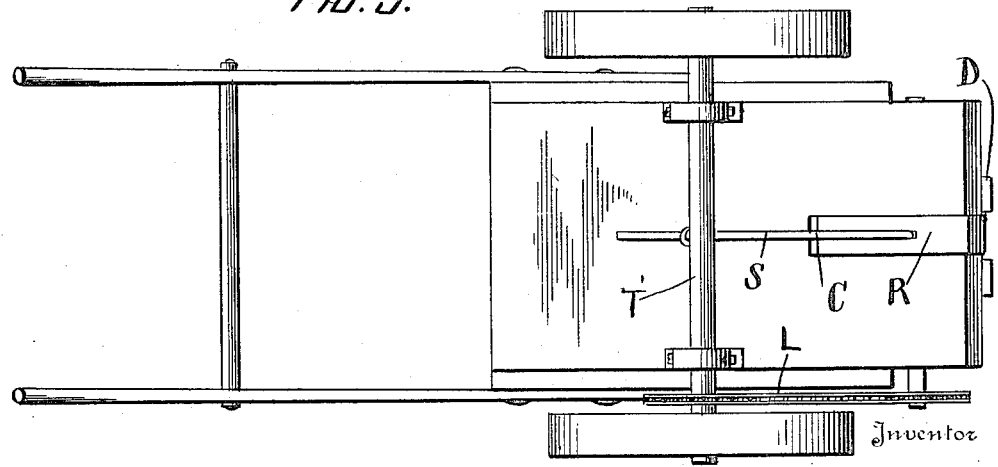

UNITED STATES PATENT OFFICE.

JULIUS WASHINGTON CRIDER, OF FAIRLAND, TEXAS.

PEANUT-PLANTER.

1,164,171.    Specification of Letters Patent.    Patented Dec. 14, 1915.

Application filed June 3, 1915. Serial No. 31,965.

*To all whom it may concern:*

Be it known that I, JULIUS W. CRIDER, a citizen of the United States, residing at Fairland, in the county of Burnet and State of Texas, have invented certain new and useful Improvements in Peanut-Planters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for planting peanuts and consists of a simple and efficient device of this nature having various details of construction, combinations and arrangements of parts which will be hereinafter fully described, shown in the accompanying drawings and then specifically defined in the appended claim.

My invention is illustrated in the accompanying drawings, in which:

Figure 1 is a side elevation of my invention. Fig. 2 is a central vertical sectional view. Fig. 3 is a bottom plan view.

Reference now being had to the details of the drawings by letter, A designates a hopper which is adapted to be mounted on suitable wheels and has an inclined bottom which is slotted as at C. Upon the rear of the hopper is a projecting portion D with a longitudinal recess or way therein, in the walls of which are journaled the shafts F and G, and H is a pulley fixed to the shaft F and a similar wheel K is fastened to the shaft G, the latter turning in a recess or opening formed in the wall of the hopper. A conveyer belt, designated by letter O, is mounted to turn upon said pulleys and has peanut holding members Q fixed thereto at intervals. In a slot formed in the bottom of said projection is a yielding block R which is pivotally mounted upon a pin R' held in the walls of the slot in which the block is mounted, and said block is held to its farthest upper limit by means of a spring S fastened to the bottom of the inclined part of the hopper. It will be noted that the free end of said block, which is preferably protected by means of a plate or shoe T, extends into the hopper and is adapted to yield as one of said peanut carrying members comes in contact therewith in the rotation of the endless belt to allow the peanut holding members to move freely through the slot in the wall of the hopper. The shaft G has a sprocket wheel J fastened thereto and which is driven by means of a sprocket chain L passing over a pulley M fixed to the driving shaft.

The operation of my invention will be readily understood and is as follows:—The peanuts to be planted are placed within the hopper and, when the truck is driven forward, the belt conveyer is actuated so that, when the peanut carrying members pass up through the hopper, it will catch and elevate a peanut which is dropped as they turn over the top of the pulley H.

What I claim to be new is:—

A peanut planter comprising a truck with a hopper-shaped box, the bottom of which is inclined and provided with a central slot extending underneath the vertical wall of the box, said wall having a slot in its lower end leading into said slot in the bottom, the upper end of the wall being provided with a slot, the side walls of the hopper projecting beyond said slotted wall and forming a way, shafts journaled in the projections of said side walls, pulleys mounted upon said shafts and turning in the slots of said vertical wall, the inner portions of said pulleys being flush with the inclined surface of the slotted wall, a belt upon said pulleys, said belt adapted to turn in contact with the inner face of the slotted wall, peanut elevating fingers upon the belt, a member mounted in the slot in the inclined bottom of the box, pivots supported by the extension of the side walls and upon which said member is mounted, a resilient rod fastened to the under surface of the bottom of the box and having one end bent at an angle and engaging the under surface of said member intermediate the pivotal point thereof and the upper free end of the member and tending to normally hold the upper surface of the latter in the paths of said fingers.

In testimony whereof I hereunto affix my signature in presence of two witnesses.

JULIUS WASHINGTON CRIDER.

Witnesses:
CARL FRANCIS,
E. W. LACKEY.

Copies of this patent may be obtained for five cents each, by addressing the "Commissioner of Patents, Washington, D. C."